United States Patent
Nakajima

(10) Patent No.: US 9,366,788 B2
(45) Date of Patent: Jun. 14, 2016

(54) HEAT RADIATION REFLECTIVE FILM AND METHOD FOR PRODUCING THE SAME, AND HEAT RADIATION REFLECTOR

(75) Inventor: Akihisa Nakajima, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 11 days.

(21) Appl. No.: 14/004,502

(22) PCT Filed: Mar. 12, 2012

(86) PCT No.: PCT/JP2012/056322
§ 371 (c)(1),
(2), (4) Date: Sep. 11, 2013

(87) PCT Pub. No.: WO2012/128109
PCT Pub. Date: Sep. 27, 2012

(65) Prior Publication Data
US 2014/0002895 A1    Jan. 2, 2014

(30) Foreign Application Priority Data

Mar. 18, 2011    (JP) ................ 2011-060736

(51) Int. Cl.
*G02B 5/08*    (2006.01)
*G02B 5/28*    (2006.01)

(52) U.S. Cl.
CPC ............... *G02B 5/0816* (2013.01); *G02B 5/08* (2013.01); *G02B 5/085* (2013.01); *G02B 5/0808* (2013.01); *G02B 5/281* (2013.01); *G02B 5/282* (2013.01)

(58) Field of Classification Search
CPC ...... G02B 5/0816; G02B 5/08; G02B 5/0808; G02B 5/0825; G02B 5/0833; G02B 5/0841; G02B 5/085; G02B 5/0858; G02B 5/0866; G02B 5/0875; G02B 5/0883; G02B 5/282
USPC .......................... 359/359, 360, 580, 584, 585
See application file for complete search history.

(56) References Cited

U.S. PATENT DOCUMENTS 4,229,066 A  *  10/1980  Rancourt ............ C03C 17/3417
                                                        359/359
5,103,337 A  *   4/1992  Schrenk ................... G02B 1/04
                                                        359/359
(Continued)

FOREIGN PATENT DOCUMENTS

EP          0 469 732          2/1992
JP          08-005833 A        1/1996
(Continued)

OTHER PUBLICATIONS

Supplemental European Search Report, EP 12 76 0882. dated Oct. 2, 2014 (9 pages).
(Continued)

*Primary Examiner* — Bumsuk Won
*Assistant Examiner* — William R Alexander
(74) *Attorney, Agent, or Firm* — Lucas & Mercanti, LLP

(57) ABSTRACT

To provide a heat radiation reflective film which has a high heat radiation reflectance and good adherence property (peel resistance), which can have a large surface area, and which de-emphasizes certain visible reflected lights; and a method for producing the film. And to provide a heat radiation reflector which includes the heat radiation reflective film as described above. A heat radiation reflective film comprising: at least one heat radiation reflective unit on one surface of a support, the unit comprising: at least 6 laminated layers, each layer having a different refractive index from an adjacent layer, wherein a first unit as one of the heat radiation reflective units comprises the layer closest to the support having a thickness which is 3 times or more of the thickness of the layer farthest from the support.

16 Claims, 3 Drawing Sheets

(56) References Cited

U.S. PATENT DOCUMENTS

| | | | | |
|---|---|---|---|---|
| 5,233,465 | A | * | 8/1993 | Wheatley ............... G02B 5/282 359/359 |
| 5,448,404 | A | * | 9/1995 | Schrenk ............... F21S 48/2212 359/584 |
| 5,449,413 | A | * | 9/1995 | Beauchamp .......... C03C 4/0085 136/256 |
| 5,568,316 | A | * | 10/1996 | Schrenk et al. ............... 359/584 |
| 6,072,549 | A | * | 6/2000 | Faris ...................... B82Y 15/00 349/113 |
| 6,391,400 | B1 | * | 5/2002 | Russell .................. B32B 17/10 296/84.1 |
| 6,849,327 | B1 | * | 2/2005 | Ikuhara ................ C09D 125/10 428/339 |
| 6,859,245 | B2 | * | 2/2005 | Faris ...................... B82Y 15/00 349/115 |
| 6,927,900 | B2 | * | 8/2005 | Liu .......................... B32B 17/10 359/359 |
| 2007/0031660 | A1 | * | 2/2007 | Kanamaru et al. ...... 428/355 AC |
| 2008/0160257 | A1 | * | 7/2008 | Takada ...................... C08J 7/04 428/145 |
| 2008/0224088 | A1 | * | 9/2008 | Tamori .................. C09D 5/022 252/62.2 |
| 2009/0029151 | A1 | * | 1/2009 | Noguchi ................. B32B 27/00 428/327 |
| 2009/0303602 | A1 | * | 12/2009 | Bright .................... G02B 1/111 359/585 |
| 2010/0220389 | A1 | * | 9/2010 | Villuendas Yuste ... G02B 5/208 359/360 |

FOREIGN PATENT DOCUMENTS

| | | | |
|---|---|---|---|
| JP | 2000-100391 | A | 4/2000 |
| JP | 2000266930 | A | 9/2000 |
| JP | 2004-123766 | A | 4/2004 |
| JP | 2004-125822 | A | 4/2004 |
| JP | 2006-091163 | A | 4/2006 |
| JP | 2007-065232 | | 3/2007 |
| JP | 2007-065259 | | 3/2007 |
| JP | 2009086659 | A | 4/2009 |
| JP | 4564016 | B2 | 8/2010 |
| JP | 2012-027287 | A | 2/2012 |

OTHER PUBLICATIONS

International Search Report of PCT/JP2012/056322 dated Jun. 26, 2012.

European Office Action: Application No. 12760882.6-1562; Issued Apr. 11, 2015; Applicant: Konica Minolta, Inc.; total of 3 pages.

Office Action dated Jan. 19, 2016; Application No. 201280013683.3; Applicant: Konica Minolta, Inc.; Title of Invention: Heat radiation reflective film and method for producing the same, and heat radiation reflector; total of 6 pages; English translation of Office Action; total of 6 pages; Grand Total of 12 pages.

* cited by examiner

HEAT RADIATION REFLECTIVE FILM AND METHOD FOR PRODUCING THE SAME, AND HEAT RADIATION REFLECTOR

CROSS-REFERENCE TO RELATED APPLICATIONS

This application is a 371 of PCT/JP2012/056322 filed on Mar. 12, 2012, which claims the priority of Japanese Application Serial No. 2011-060736 filed on Mar. 18, 2011, the contents of each of which are incorporated herein by reference.

BACKGROUND

1. Technical Field

The present invention relates to a heat radiation reflective film and a method for producing the film, and a heat radiation reflector which includes the heat radiation reflective film.

2. Description of Related Arts

In recent years, a growing interest in energy conservation measures results in a growing demand for a heat radiation reflective film which blocks the transmission of solar heat through the window glass of a building and a vehicle to reduce the load on a cooling system.

The spectrum of the solar light ranges from the ultraviolet to the infrared. Visible light, which corresponds to a color range of violet through yellow to red and a wavelength range of from 380 nm to 780 nm, occupies about 45% of the solar light. Infrared light occupies about 50% of the solar light. Infrared light includes the near-infrared light (wavelength range of from 780 nm to 2500 nm) near the visible region and the mid-infrared light in above the range. The light energy in the infrared region is as low as about one tenth or less of the light energy in the ultraviolet region, while infrared light has great thermal effects. When infrared light is absorbed by a material, the absorbed energy is converted into heat, which is then radiated into the atmosphere, thereby increasing the temperature. Therefore, infrared light is also called heat radiation. Blocking of such radiation allows preventing a temperature rise in the room. The blocking also allows preventing heat within the room from dissipating into the environment during the winter in cold climates.

Heat radiation reflective films produced by laminating high refractive index layers and low refractive index layers alternately by a deposition method or a dry film forming method such as a sputtering method have been previously proposed (see, for example, Patent Document 1). The dry film forming method, however, results in increase in manufacturing costs. And with this method, it is difficult to produce a heat radiation reflective film with a large surface area, and problems such as limitation to heat-resistant materials arise.

To address these problems, methods of using rutile-type titanium oxide particles which are surface-treated with a heterocyclic nitrogen compound, and a UV-cured resin to form a high refractive index layer are disclosed (see, for example, Patent Documents 2 and 3).

As the methods, however, include laminating a low refractive index layer and a high refractive index layer alternately by repetition of application, drying, and curing, the interfaces between the layers are distinct, and the bond strength between the layers is low. Thus, application of a high peel force results in delamination of layers.

RELATED ART DOCUMENTS

Patent Documents

Patent Document 1: Japanese Patent No. 4564016
Patent Document 2: Japanese Patent Application Publication No. 2004-123766
Patent Document 3: Japanese Patent Application Publication No. 2004-125822

SUMMARY

1. Problems to be Solved by the Invention

The present invention has been made in view of the foregoing problems and situations. An object of the present invention is to provide a heat radiation reflective film which has a high heat radiation reflectance and good adherence property (peel resistance), which can have a large surface area, and which de-emphasizes certain visible reflected lights; and a method for producing the film. Another object of the present invention is to provide a heat radiation reflector which includes the heat radiation reflective film as described above.

2. Means of Solving the Problems

The present inventors have considered various aspects of the problems in a heat radiation reflective film (conventional heat radiation reflective film) formed by a conventional method of laminating high refractive index layers and low refractive index layers alternately. The conventional heat radiation reflective film includes a problem that most of the interfaces between the layers are distinct, a problem that the bond strength between the layers is low, and a problem that application of a high peel force results in delamination of layers. As a result, the inventors have found that the source of the problems is concentration of force on the interlayers and that concentration of force interior of the layers rather than the interlayers allows increase in peel resistance. The inventors have also found that, to concentrate force on the interlayers, it is necessary to include a thick layer (film); that the thick layer (film) may not always be located in any place in a heat radiation reflective unit which includes low refractive index layers and high refractive index layers laminated alternately; and that it is preferable that one or two layers located in closer to a support of the heat radiation reflective unit would be thick.

In addition, it has been found that it is preferred to include a blended region between the adjacent layers, since lamination of layers leads to significant delamination.

It has been also found that stacking of heat radiation reflective units which include low refractive index layers and high refractive index layers laminated alternately leads reflection of light in the visible region. However, the inventors have found that a thinner blended region between the heat radiation reflective units allows production of complex reflections, thereby providing a heat radiation reflective film which reflects light across the whole visible region rather than light in specified visible light wavelength ranges and thus de-emphasizes certain visible reflected lights and which exhibits improved peel resistance. Based on the above findings, the inventors have completed the present invention.

The above problems addressed by the present invention are solved by the following means:

1. A heat radiation reflective film comprising:
at least one heat radiation reflective unit on one surface of a support, the unit comprising:
at least 6 laminated layers, each layer having a different refractive index from an adjacent layer,
wherein a first unit as one of the heat radiation reflective units comprises the layer closest to the support having a thickness which is 3 times or more of the thickness of the layer farthest from the support.

2. The heat radiation reflective film of 1, wherein the first unit comprises a layer which is adjacent to the layer closest to the support and which has a thickness which is 3 times or more of the thickness of the layer farthest from the support.

3. The heat radiation reflective film of 1 or 2, wherein the layers which constitute the first unit adjoins each other via a blended region having a thickness 0.4-0.8 time of the thickness of the layer farthest from the support.

4. The hear radiation reflective film of any one of 1-3, wherein the first unit adjoins two adjacent heat radiation reflective units, via a blended region having a thickness 0.1-0.4 time of the thickness of the layer farthest from the support to the first unit connect with the first unit via a blended region having a thickness which is 0.1-0.4 time of the thickness of the layer farthest from the support.

5. A method for producing the heat radiation reflective film of any one of 1-4, the method comprising a step of forming layers which constitute the heat radiation reflective film by use of an aqueous-based coating solution.

6. A heat radiation reflector including the heat radiation reflective film of any one of 1-4 or a heat-reflective film produced by the method of 5.

3. Effects of the Invention

By the above means, the present invention can provide a heat radiation reflective film which has a high heat radiation reflectance and good adherence property (peel resistance), which can have a large surface area, and which de-emphasizes certain visible reflected lights; and a method for producing the film. The present invention can also provide a heat radiation reflector which includes the heat radiation reflective film as described above.

DETAILED DESCRIPTION

Figure 1:
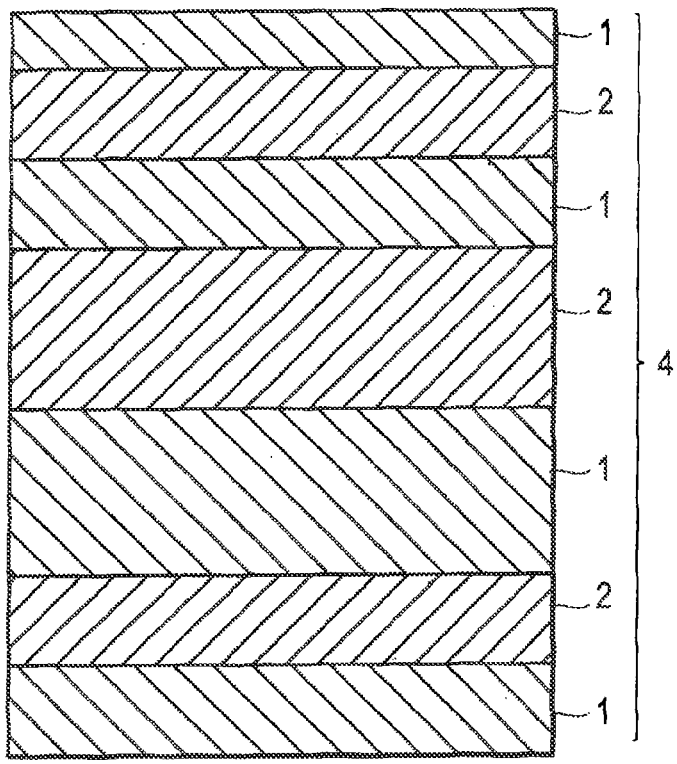
FIG. 1 is a schematic cross-sectional view of a conventional heat radiation reflective unit.

A heat radiation reflective film of the present invention includes at least one heat radiation reflective unit on one surface of a support, which includes at least 6 laminated layers having a different refractive index from the adjacent layer, wherein a first unit as one of the heat radiation reflective units includes the layer closest to the support having a thickness which is 3 times or more of the thickness of the layer farthest from the support. These features are common technical feature to the aspects of the appended claims 1-6.

In an embodiment of the present invention, a thickness of the layer, which is included in the first unit, closest to the support is preferably 3 times or more of the thickness of the layer farthest from the support, in order to effectively provide the effects of the invention. And the layers which constitute the first unit preferably adjoin each other via a blended region having a thickness 0.4-0.8 time of the thickness of the layer farthest from the support.

In the present invention, the first unit preferably adjoins two adjacent heat radiation reflective units, via a blended region having a thickness 0.1-0.4 time of the thickness of the layer farthest from the support.

A method for producing a heat radiation reflective film of the present invention preferably includes a step of forming the layers which constitute the heat radiation reflective film using an aqueous-based coating solution.

A heat radiation reflective film of the present invention can be suitably used in various heat radiation reflectors.

Hereinafter, the present invention, the components of the invention, and modes and aspects for carrying out the invention will be described in detail. The recitation of numerical ranges by endpoints herein includes the lower endpoint as the minimum value and the upper endpoint as the maximum value.

<<Support>>

The support (also referred to as "substrate") of the present invention may be any support as long as it is formed of a transparent organic material.

Examples of the support can include, for example, films of various resins such as methacrylic acid esters, polyethylene terephthalate (PET), polyethylene naphthalate (PEN), polycarbonate (PC), polyalylate, polystyrene (PS), aromatic polyamide, polyether ether ketone, polysulfone, polyethersulfone, polyimide, and polyetherimide, and resin films produced by laminating two or more layers of a resin as listed above. It is preferred to use the resins such as polyethylene terephthalate (PET), polyethylene naphthalate (PEN), and polycarbonate (PC) in view of costs and availability.

The support preferably has a thickness of about 5-200 μm and more preferably 15-150 μm.

The support of the present invention preferably has a transmittance in the visible region of 85% or more and more preferably 90% or more, as measured in accordance with JIS R3106-1998. The support having such transmittance is preferred, because a heat radiation reflective film applied onto such support can advantageously have a transmittance in the visible region of 50% or more, as measured in accordance with JIS R3106-1998.

The support formed of a resin as listed above may be an unstretched film or a stretched film. The stretched film is preferred in view of enhancement of strength and prevention of thermal expansion.

The support used in the present invention can be produced by a conventionally known common method. For example, a resin for forming the support can be melted in an extruder, extruded through an annular die or a T die, and quickly quenched to produce an unoriented and unstretched support which is substantially amorphous. Such unstretched support can be stretched in the moving direction (longitudinal direction) of the support or in a direction perpendicular to the moving direction (transverse direction) of the support by a known method such as uniaxial stretching, biaxial stretching by the sequential tenter process, biaxial stretching by the simultaneous tenter process, and simultaneous biaxial stretching by the tubular stretching process to produce a stretched support. Although the stretching ratio can be selected according to a resin for forming the support, the unstretched support is preferably stretched to 2-10 times in both the longitudinal direction and the transverse direction.

The support used in the present invention may be treated to relax and off-line heat-treated for dimensional stability. The relaxation treatment is preferably carried out in a tenter for transverse stretching, after heat-setting a polyester film during the process of stretching and forming the film, or between a winder and the tenter. The relaxation treatment is preferably carried out at a treatment temperature of 80-200° C. and more preferably 100-180° C. The relaxation rate of the support is preferably 0.1-10% and more preferably 2-6% in both the longitudinal direction and the transverse direction. The relaxed support is off-line heat-treated as described below to provide improved heat resistance and better dimensional stability.

Preferably, a primer is applied in-line onto one or both surfaces of the support of the present invention during the film forming process. In the present invention, application of the primer during the film forming process is referred to as in-line priming. Examples of a resin in the primer useful for the present invention can include polyester resins, acrylic modified polyester resins, polyurethane resins, acrylic resins, vinyl resins, vinylidene chloride resins, polyethylene imine vinylidene resins, polyethylene imine resins, polyvinyl alcohol resins, modified polyvinyl alcohol resins, and gelatin, all of which can be preferably used. The primer can include a conventionally known additive. The primer can be coated by a known process such as roll coating, gravure coating, knife coating, dip coating, and spray coating. The primer is preferably applied in a dry weight of about 0.01-2 g/m$^2$.

<<General Arrangement of Heat Radiation Reflective Unit>>

A heat radiation reflective film of the present invention includes at least one heat radiation reflective unit on one surface of a support, which includes at least 6 laminated layers having a different refractive index from the adjacent layer. One of the heat radiation reflective units includes the layer closest to the support having a thickness which is 3 times or more of the thickness of the layer farthest from the support. The layer closest to the support preferably has a thickness which is 3.5 times or more, more preferably 3.8 times or more, still more preferably 4 times or more, especially preferably 4.5 times or more, and most preferably 5 times or more of the thickness of the layer farthest from the support.

In this description, the one of the heat radiation reflective units includes the layer closest to the support which has a thickness 3 times or more of the thickness of the layer farthest from the support, the unit is also referred to as "first unit". The heat radiation reflective film may include one or more of the units (first units) which meet the thickness requirement described above. The first unit may be disposed on the support. Alternatively, another heat radiation reflective unit may be disposed on both sides (or one side) of the first unit, and thus the first unit may be disposed away from the support.

The layer closest to the support preferably has a thickness of 350-1000 nm and more preferably 400-800 nm. The layer farthest from the support preferably has a thickness of 60-200 nm and more preferably 80-180 nm.

In an embodiment of the present invention, any one of the heat radiation reflective units (first unit) includes the layer adjacent to the layer closest to the support which preferably has a thickness which is 2 times or more, more preferably 3 times or more, and still more preferably 3.3 times or more of the thickness of the layer farthest from the support. The layer adjacent to the layer closest to the support preferably has a thickness of 60-500 nm and more preferably 100-450 nm.

Other layers which constitute the unit (the layers other than the layer closest to the support, the layer adjacent to the layer closest to the support, and the layer farthest from the support) preferably have a thickness of 60-500 nm and more preferably 100-450 nm.

The layers which constitute the heat radiation reflective units (first unit) preferably adjoin each other via a blended region having a thickness 0.4-0.8 time of the thickness of the layer farthest from the support. More preferably, the blended region has a thickness which is 0.4-0.7 time of the thickness of the layer farthest from the support. Inclusion of the blended region which meets the thickness requirement described above between the adjacent layers in the unit allows increase in the contact area between the layers, which is preferred for adhesion enhancement.

In an embodiment of the present invention, the first unit preferably adjoins two adjacent heat radiation reflective units, via a blended region preferably having a thickness which is 0.1 time or more and less than 1 time, more preferably 0.1-0.9 time, and still more preferably 0.1-0.4 time of the thickness of the layer farthest from the support in the first unit. It is preferred to include the blended region between the units which meets the thickness requirement described above, because blende integrated heat radiation reflectance is raised, and when the film thickness is unequal, the peak of a sideband for a visible light wavelength range is broadened. The blended region between the units which meets the thickness requirement described above may be disposed on one or both sides of the first unit of the heat radiation reflective film.

The heat radiation reflective unit of the present invention comprises at least 6 layers, and each layer has a different refractive index from an adjacent layer. The "layer having a different refractive index from an adjacent layer" means a refractive layer which has a different refractive index from a layer adjacent to itself. The heat radiation reflective unit of the present invention may include the refractive layers which meets such refractive index requirement laminated alternately. The layers of the at least 6 layers which have a different refractive index from the adjacent layer and which have a relatively high refractive index are referred to as "high refractive index layer", while the layers which have a relatively low refractive index are referred to as "low refractive index layer". In other words, the refractive layers laminated alternately, the layers having a higher refractive index than the adjacent layer, are referred to as high refractive index layer, while the layers having a lower refractive index than the adjacent layer are referred to as low refractive index layer. The heat radiation reflective unit of the present invention preferably includes the high refractive index layers and the low refractive index layers laminated alternately.

FIG. 1 illustrates a conventional heat radiation reflective unit (first unit) 4 which includes low refractive index layers 1 and high refractive index layers 2 laminated alternately.

Figure 2:
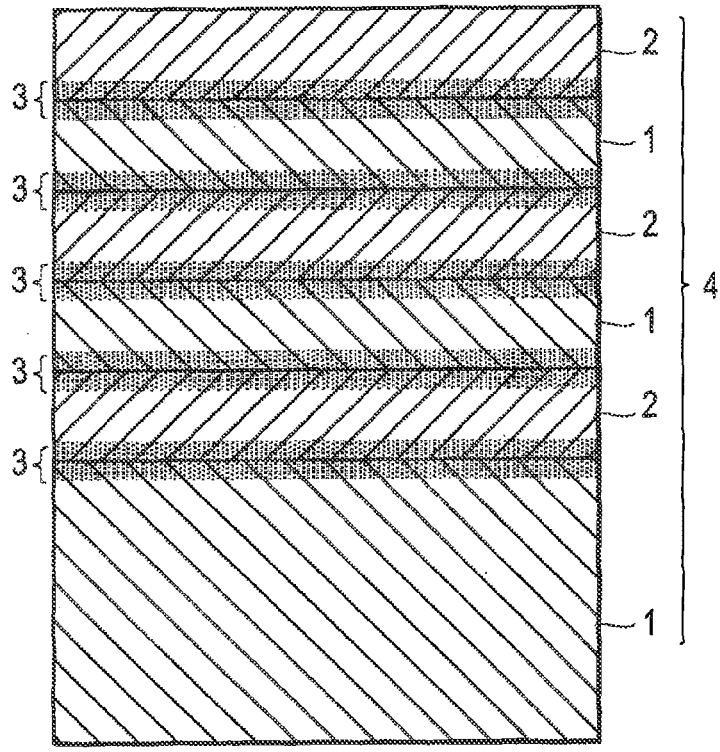
FIG. 2 is a schematic cross-sectional view of a heat radiation reflective unit of an embodiment of the present invention, the unit including blended regions having a thickness which is 0.4-0.8 time of the thickness of the layer farthest from the support.

FIG. 2 illustrates a heat radiation reflective unit (first unit) 4 of an embodiment of the present invention, the unit including low refractive index layers 1 and high refractive index layers 2 laminated alternately via blended regions 3.

Figure 3:
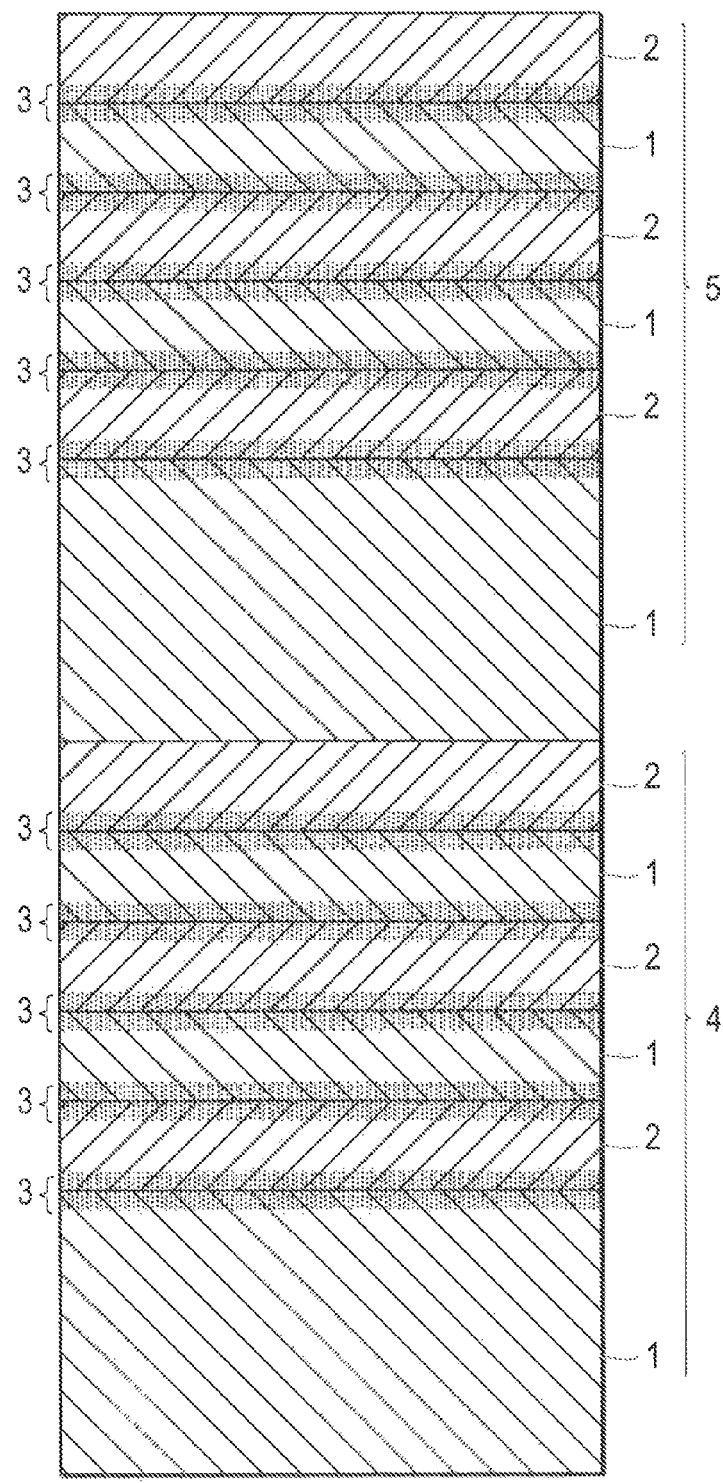
FIG. 3 is a schematic cross-sectional view of a stack of two heat radiation reflective units of an embodiment of the present invention, the units including blended regions having a thickness which 0.4-0.8 time of the thickness of the layer farthest from the support.

FIG. 3 illustrates a heat radiation reflective film which consists of a stack of two heat radiation reflective units, the film including a heat radiation reflective unit (first unit) 4 and a heat radiation reflective unit 5 disposed on the first unit 4 (unit adjacent to the first unit).

Figure 4:
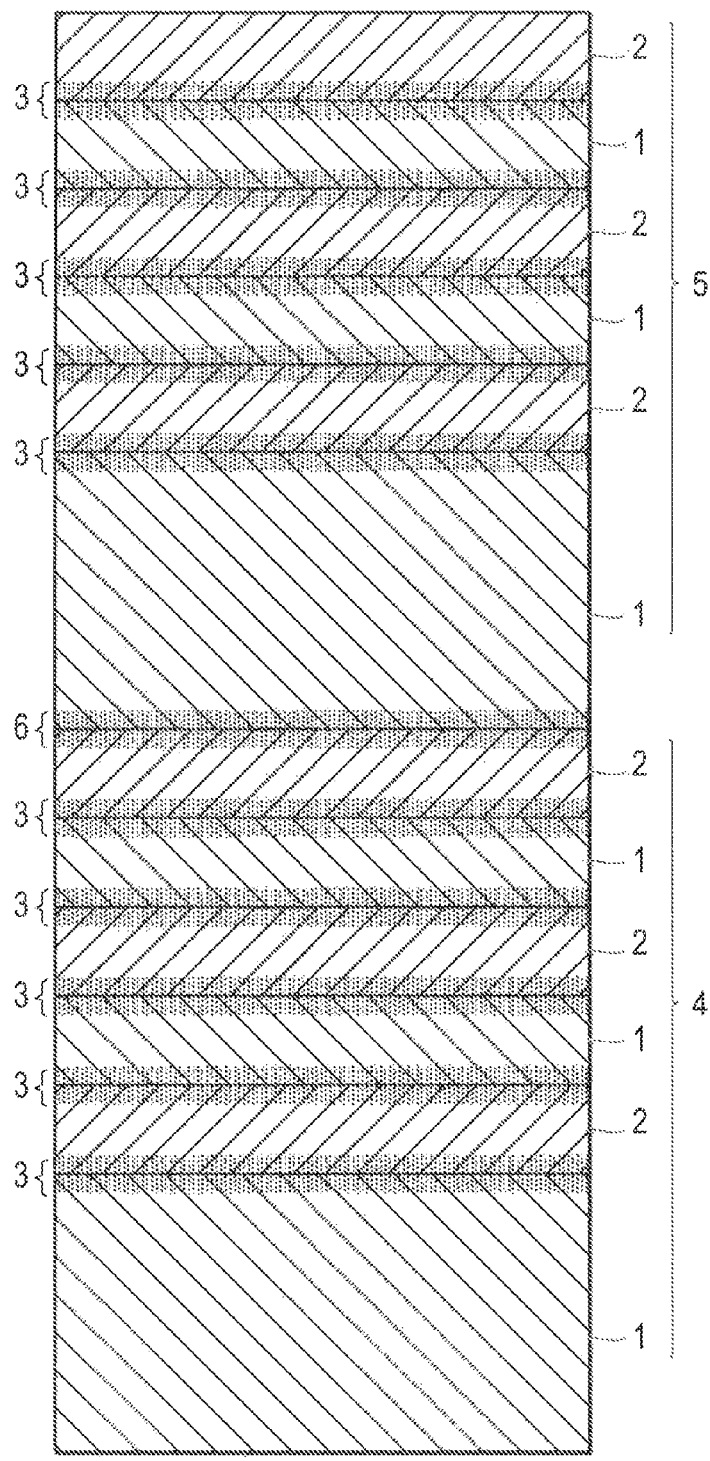
FIG. 4 is a schematic cross-sectional view of a stack of two heat radiation reflective units of an embodiment of the present invention, the units including blended regions having a thickness which is 0.4-0.8 time of the layer farthest from the support, and the units connecting with each other via a blended region having a thickness which is 0.1-0.4 time of the thickness of the layer farthest from the support.

FIG. 4 illustrates a heat radiation reflective film which consists of a stack of two heat radiation reflective units, the film including a heat radiation reflective unit (first unit) 4, a heat radiation reflective unit 5 disposed on the first unit 4 (unit adjacent to the first unit) via a blended region 6 between the units.

The "blended region" of the present invention refers to the region in which refractive index varies continually. The area is formed when a coating solution for forming a high refractive index layer and a coating solution for forming a low refractive index layer are applied simultaneously to form multiple layers. The components of the coating solutions (high refractive materials and low refractive materials) are blended, consequently, the interface between the high refractive index layer and the low refractive index layer include a blend of the high refractive material and the low refractive material. Alternatively, the "blended region" refers to the region in which refractive index continually varies across the width direction. In the region, the interface between the high refractive index layer and the low refractive index layer has asperities. The region can be thickened by reducing the cooling (chilling) time or increasing the cooling temperature. Such continually varying refractive index allows good bond between the layers laminated alternately and reduction in reflected light corresponding to the sideband for the visible region.

For example, the coating solution for forming a high refractive index layer and the coating solution for forming a low refractive index layer can be sequentially or simultaneously applied to form multiple layers, and the applied solutions are cooled (chilled) preferably to 0-20° C. and more preferably 0-15° C., preferably for a period of from 10 seconds to 10 minutes and more preferably from 30 seconds to 5 minutes and then dried preferably at 40-90° C. and more preferably 45-80° C., preferably for a period of from 30 seconds to 30 minutes and more preferably from 45 seconds to 5 minutes to form a blended region having a desired thickness.

In a case in which a unit is formed and then another unit was formed on the unit, for example, the coating solution for forming a high refractive index layer and the coating solution for forming a low refractive index layer are applied, using a coater, onto the unit previously formed by an application and drying process to form multiple layers. Then the applied solutions are cooled (chilled) preferably to 0-20° C. and more preferably 0-15° C., preferably for a period of from 10 seconds to 10 minutes and more preferably from 30 seconds to 3 minutes and dried preferably at 40-90° C. and more preferably 45-80° C., preferably for a period of from 30 seconds to 30 minutes and more preferably from 45 seconds to 5 minutes to form, between the units, a blended region having a desired thickness.

In a case in which a low refractive index layer includes a blended region, the "low refractive index layer" refers to a region which extends from the center line of the blended region on the upper end of the low refractive index layer (upper half), the line parallel with the support, to the center line of the blended region on the lower end of the low refractive index layer (lower half), the lines parallel with the support.

In a case in which a high refractive index layer includes a blended region, the "high refractive index layer" refers to the region which extends from the center line of the blended region on the upper end of the high refractive index layer (upper half), the line parallel with the support, to the center line of the blended region on the lower end of the high refractive index layer (lower half), the line parallel with the support.

In a case in which a layer closest to the support and a layer farthest from the support includes a blended region, the "layer closest to the support" and the "layer farthest from the support" refer to the region which extends from the center line of the blended region on the upper end of the layer (upper half), the line parallel with the support, to the center line of the blended region on the lower end of the layer (lower half), the line parallel with the support. Similarly, the thickness of each refractive layer refer to the distance between the center line of the blended region on the upper end of the layer (upper half), the line parallel with the support, and the center line of the blended region on the lower end of the layer (lower half), the line parallel with the support.

In a case in which the alternating layered structure is formed by the simultaneous multilayer application as described above to include blended regions between the high refractive index layers and the low refractive index layers, and in which, for example, titanium oxide as the high refractive material is included in the high refractive index layers and for example, silicon oxide as the low refractive material is included in the low refractive index layers, the refractive index profile can be determined by measuring metal oxide concentration profiles in the thickness direction of the laminated layers.

The refractive index can be determined by the composition using the metal oxide concentration profile in the thickness direction of the laminated layers. The metal oxide concentration profile of the laminated layers can be measured by etching the layer from the surface to the depth by sputtering the layers from the outermost surface as 0 nm at a rate of 0.5 nm/min using an XPS surface analyzer to determine the atomic composition ratio. The concentration profile can also be determined by cutting the laminated layers and measuring the cross-section using an XPS surface analyzer to determine the atomic composition ratio. In a case in which a blended region has a discontinuously varying metal oxide concentration, the boundaries can be recognized in the cross-sectional micrograph observed in an electron microscope (TEM).

Although any types of XPS surface analyzers can be used without limitation, VG Scientific ESCALAB-200R was used in the present invention. Mg was used for the X-ray anode, and measurements were taken at an output of 600 W (acceleration voltage of 15 kV, emission current 40 mA).

For the reflection of the heat radiation reflective film, a larger difference of refractive index between the high refractive index layers and the low refractive index layers is preferred, because the larger the difference, the fewer the number of layers required to provide a high heat radiation (infrared) reflectance. In the present invention, the unit includes 6 or more layers consisting of the high refractive index layers and the low refractive index layers laminated alternately. The difference of refractive index between the high refractive index layers and the low refractive index layers which adjoin mutually is preferably 0.1 or more, more preferably 0.3 or more, and still more preferably 0.4 or more.

Although the number of the units including 6 or more layers per unit depends on the difference of refractive index between the high refractive index layers and the low refractive index layers, the number of the units is preferably 40 or less, more preferably 20 or less, and still more preferably 10 or less.

In the present invention, the refractive index of the high refractive index layers and the low refractive index layers can be measured by the following method.

Samples are prepared by attaching, onto a substrate, a single refractive index layer to be measured. The samples are cut into a 10 cm×10 cm sheet and measured for refractive index by the following process. U-4000 spectrophotometer from Hitachi, Ltd. is used in the measurement. The backside of the surface to be measured of each of the samples is roughened and treated with black spray such that the backside absorbs light, thereby preventing reflection of light. 25 points in the samples are measured at a specular angle of 5 degree for the reflectance of visible light in the visible range from 400 to 700 nm, and the measurements are averaged to determine the average refractive index.

The high refractive index layers in the present invention preferably have a refractive index of 1.80-2.50 and more preferably 1.90-2.20. The low refractive index layers preferably have a refractive index of 1.10-1.60 and more preferably 1.30-1.50.

The heat radiation reflective film of the present invention preferably has a layer structure including the layer adjacent to the substrate which is a low refractive index layer including silicon oxide and the outermost layer which is also a low refractive index layer including silicon oxide.

In a preferred embodiment of the present invention, both of the high refractive index layers and the low refractive index layers include metal oxide particles and a water-soluble resin.

In the present invention, heat radiation reflectiveness may be imparted to one side of the support or both sides of the support. In a case in which the reflectiveness is imparted to only one side of the support, the heat radiation reflective unit as described above is disposed on the side. In a case in which the reflectiveness is imparted to both sides of the support, the heat radiation reflective unit as described above is disposed on one side, while the heat radiation reflective unit as described above or a heat radiation reflective unit having a different arrangement may be disposed on the opposite side.

(Metal Oxide Particles)

Examples of the metal oxide particles of the present invention can include, for example, titanium dioxide, zirconium oxide, zinc oxide, synthetic amorphous silica, silicon dioxide (preferably colloidal silica), alumina, colloidal alumina, lead titanate, red lead, chrome yellow, zinc yellow, chromium oxide, ferric oxide, black iron oxide, copper oxide, magnesium oxide, magnesium hydroxide, strontium titanate, yttrium oxide, niobium oxide, europium oxide, lanthanum oxide, zircon, and tin oxide.

The high refractive index layers and the low refractive index layers include the metal oxide particles preferably in an amount of from 50% by mass to 95% by mass and more preferably from 60% by mass to 90% by mass based on the total solid of the respective refractive layer. If the refractive layers include the metal oxide particles in an amount of 50% by mass or more, the difference of refractive index between the high refractive index layers and the low refractive index layers is readily increased. If the refractive layers include the metal oxide particles in an amount of 95% by mass or less, the layers provide flexibility to the film, thereby readily forming the heat radiation reflective film.

Each of the refractive index layers preferably has a mass ratio of the metal oxide particles (F) to a water-soluble polymer (B), which is a binder constituting each of the layers, (F/B) of 0.5-20 and more preferably 1.0-10.

Preferred examples of the metal oxide particles used for the high refractive index layers of the present invention include $TiO_2$, $ZnO$, and $ZrO_2$. For stability of a metal oxide particles-containing solution for forming the high refractive index layers as described below, $TiO_2$ (titanium dioxide sol) is more preferred. Among $TiO_2$, rutile type $TiO_2$ is more preferred, because such $TiO_2$ improves weather resistance of the high refractive index layers and their adjacent layer due to its low catalytic activity and has a high refractive index.

Methods for preparing titanium dioxide sol which can be used in the present invention can be found in, for example, Japanese Patent Application Publication No. 363-17221, Japanese Patent Application Publication No. H7-819, Japanese Patent Application Publication No. H9-165218, and Japanese Patent Application Publication No. H11-43327.

Other methods for preparing titanium dioxide sol can be found in, for example, Japanese Patent Application Publication No. S63-17221, Japanese Patent Application Publication No. H7-819, Japanese Patent Application Publication No. H9-165218, and Japanese Patent Application Publication No. H11-43327.

The titanium dioxide particles preferably have a primary particle diameter (volume average particle diameter) of 4-50 nm and more preferably 4-30 nm.

The low refractive index layers of the present invention preferably includes silicon dioxide particles and especially preferably acidic colloidal silica sol as the metal oxide particles.

The silicon dioxide particles of the present invention preferably have an average particle diameter (volume average particle diameter) of 100 nm or less. The silicon dioxide dispersed as primary particles preferably has an average particle diameter of the primary particles (particle diameter of the particles in the dispersion before application) of 50 nm or less, more preferably 30 nm or less, and especially preferably 20 nm or less. The secondary particles preferably have an average particle diameter of 30 nm or less for reduction in haze and improvement of visible light transmission.

The volume average particle diameter of the titanium oxide particles of the present invention is determined by directly observing the particles by a laser diffraction scattering method, a dynamic light scattering method, or observing with an electron microscope, or observing an image of the particles in a surface or a cross-section of the refractive layers in an electron microscope to measure the particle diameter (primary particle diameter) of 1,000 random particles. The titanium oxide particulates which include particles $n_1, n_2, \ldots, n_i, \ldots, n_k$ having particle diameters $d_1, d_2, \ldots, d_i, \ldots, d_k$, respectively, have a volume average particle diameter given by $m_v = \{\Sigma(v_i \cdot d_i)\}/\{\Sigma(v_i)\}$, wherein $v_i$ is a volume per particle.

[Water-Soluble Polymer]

In the present invention, at least one layer of two or more layers which have a different refractive index from one another preferably includes the metal oxide particles and a water-soluble polymer.

The water-soluble polymer which can be used in the present invention is preferably at least one selected from, especially, reactive functional polymers, inorganic polymers, thickening polysaccharides, collagen peptides, and gelatin. Among them, reactive functional polymers, thickening polysaccharides, collagen peptides, and gelatin are preferred. In a preferred embodiment of the present invention, a refractive layer and the layer adjacent to the refractive layer preferably include a different water-soluble polymer to avoid blending the coating solutions during application and drying, thereby preventing formation of layers with uniform refractive index. These water-soluble polymers may be used individually or in combination of two or more thereof.

As used herein, the term "water-soluble polymer" means that the polymer is soluble in an aqueous medium at 25° C. to the extent of at least 1% by mass.

The coating solution for forming a high refractive index layer and the coating solution for forming a low refractive index layer of the present invention preferably include the water-soluble polymer at a concentration of 0.3-3.0% by mass and more preferably 0.35-2.0% by mass.

Now, each of the water-soluble polymers will be described in detail.

<Reactive Functional Polymer>

A preferred example of the water-soluble polymer which can be used in the present invention is a reactive functional polymer.

Examples of the reactive functional polymer which can be used in the present invention include, for example, acrylic resins such as polyvinyl alcohols, polyvinyl pyrrolidones, polyacrylic acids, acrylic acid-acrylonitrile copolymers, potassium acrylate-acrylonitrile copolymers, vinyl acetate-acrylic acid ester copolymers, and acrylic acid-acrylic acid ester copolymers; styrene-acrylic resins such as styrene-acrylic acid copolymers, styrene-methacrylic acid copolymers, styrene-methacrylic acid-acrylic acid ester copolymers, styrenes-α-methylstyrene-acrylic acid copolymers, and styrene-α-methylstyrene-acrylic acid-acrylic acid ester copolymers; vinyl acetate-based copolymers such as styrene-sodium styrene sulfonate copolymers, styrene-2-hydroxyethyl acrylate copolymers, styrene-2-hydroxyethyl acrylate-potassium styrene sulfonate copolymers, styrene-maleic acid copolymers, styrene-maleic anhydride copolymers, vinyl-naphthalene-acrylic acid copolymers, vinylnaphthalene-maleic acid copolymers, vinyl acetate-maleic acid ester copolymers, vinyl acetate-crotonic acid copolymers, and vinyl acetate-acrylic acid copolymers; and salts thereof. Among them, polyvinyl alcohols, polyvinyl pyrrolidones, and copolymers which include them are especially preferred.

The water-soluble polymer preferably has a weight-average molecular weight of from 1,000 to 200,000 and more preferably from 3,000 to 40,000.

Preferred examples of the polyvinyl alcohols used in the present invention include a common polyvinyl alcohol formed by hydrolyzing a polyvinyl acetate homopolymer, a stereoregular polyvinyl alcohol formed by hydrolyzing a polyvinyl pivalate copolymer, a cation-modified polyvinyl alcohol with a terminal cationic group, an anion-modified polyvinyl alcohol with an anionic group, and a modified polyvinyl alcohol formed by hydrolyzing a polyvinyl acetate copolymer. A preferred example of the modified polyvinyl alcohols which can be used includes a modified polyvinyl alcohol formed by hydrolyzing a vinyl acetate-ethylene copolymer, the polyvinyl alcohol sold by Kuraray Co., Ltd. under the trade name of Exceval.

The polyvinyl alcohol formed by hydrolyzing vinyl acetate preferably has an average degree of polymerization of 1,000 or more and more preferably 1,500-5,000, and preferably has a degree of saponification of 70-100% and more preferably 80-99.5%.

An examples of the cation-modified polyvinyl alcohol is a polyvinyl alcohol having a primary to tertiary amino group or a quaternary ammonium group in the backbone or a side chain, as described in, for example, Japanese Patent Application Publication No. S61-10483, and such polyvinyl alcohol is formed by saponifying a copolymer of ethylenically unsaturated monomers with a cationic group and vinyl acetate.

Examples of the ethylenically unsaturated monomers with a cationic group include, for example, trimethyl-(2-acrylamide-2,2-dimethylethyl ammonium chloride, trimethyl-(3-acrylamide-3,3-dimethylpropyl)ammonium chloride, N-vinylimidazole, N-vinyl-2-methyl imidazole, N-(3-dimethylaminopropyl)methacrylamide, hydroxylethyl trimethyl ammonium chloride, trimethyl-(2-methacrylamide propyl)ammonium chloride, and N-(1,1-dimethyl-3-dimethylaminopropyl)acryl amide. The cation-modified polyvinyl alcohol has a ratio of the monomers with a cationic group to the vinyl acetate of 0.1-10 mole percent and preferably 0.2-5 mole percent.

Examples of the anion-modified polyvinyl alcohol include, for example, a polyvinyl alcohol with an anionic group as described in Japanese Patent Application Publication No. H1-206088, a copolymer of vinyl alcohol and a vinyl compound with a water-soluble group as described in Japanese Patent Application Publication No. S61-237681 and S63-307979, and a modified polyvinyl alcohol with a water-soluble group as described in Japanese Patent Application Publication No. H7-235265.

Examples of the nonionic-modified polyvinyl alcohol include, for example, a polyvinyl alcohol derivative with a polyalkylene oxide group added to part of the vinyl alcohol as described in Japanese Patent Application Publication No. H7-9758, and a block copolymer of a vinyl compound with a hydrophobic group and vinyl alcohol as described in Japanese Patent Application Publication No. H8-25795. A combination of two or more of the polyvinyl alcohols which have, for example, a different polymerization degree and a different modification type can be used.

In a case in which a reactive functional polymer is used in the present invention, a curing agent may be used. In a case in the reactive functional polymer is a polyvinyl alcohol, a boric acid and a salt thereof and an epoxy curing agent as described below are preferred as the curing agent.

<Inorganic Polymer>

A preferred example of the water-soluble polymer which can be used in the present invention is an inorganic polymer such as a compound containing zirconium atom and a compound containing aluminum atom.

Specific examples of the zirconium atom containing compound which can be used in the present invention exclude zirconium oxide and include zirconium difluoride, zirconium trifluoride, zirconium tetrafluoride, hexafluorozirconate (such as, for example, the potassium salt), heptafluorozirconate (such as, for example, the sodium salt, the potassium salt, and the ammonium salt), octafluorozirconate (such as, for example, the lithium salt), zirconium fluoride oxide, zirconium dichloride, zirconium trichloride, zirconium tetrachloride, hexachlorozirconate (such as, for example, the sodium salt and the potassium salt), zirconium oxychloride (zirconyl chloride), zirconium dibromide, zirconium tribromide, zirconium tetrabromide, zirconium bromide oxide, zirconium triiodide, zirconium tetraiodide, zirconium peroxide, zirconium hydroxide, zirconium sulfide, zirconium sulfate, zirconium p-toluenesulfonate, zirconyl sulfate, sodium zirconyl sulfate, acidic zirconyl sulfate trihydrate, potassium zirconyl sulfate, zirconium selenate, zirconium nitrate, zirconyl nitrate, zirconium phosphate, zirconyl carbonate, ammonium zirconyl carbonate, zirconium acetate, zirconyl acetate, ammonium zirconyl acetate, zirconyl lactate, zirconyl citrate, zirconyl stearate, zirconyl phosphate, zirconium oxalate, zirconium isopropyl rate, zirconium butyrate, zirconium acetylacetonate, acetylacetone zirconium butyrate, zirconium stearate butyrate, zirconium acetate, bis(acetyl acetonato)dichlorozirconium, and tris(acetyl acetonato)chlorozirconium.

Among these compounds, zirconyl chloride, zirconyl sulfate, sodium zirconyl sulfate, acidic zirconyl sulfate trihydrate, zirconyl nitrate, zirconyl carbonate, ammonium zirconyl carbonate, zirconyl acetate, ammonium zirconyl acetate, and zirconyl stearate are preferred. More preferred are zirconyl carbonate, ammonium zirconyl carbonate, zirconyl acetate, zirconyl nitrate, and zirconyl chloride, and especially preferred are ammonium zirconyl carbonate, zirconyl chloride, and zirconyl acetate. Specific examples of commercially available products of the compounds include Zircosol ZA-20 (zirconyl acetate) from Daiich Kigenso Kagaku Kogyo Co., Ltd., Zircosol ZC-2 (zirconyl chloride) from Daiich Kigenso Kagaku Kogyo Co., Ltd., and Zircosol ZN (zirconyl nitrate) from Daiich Kigenso Kagaku Kogyo Co., Ltd.

Representative compounds of the inorganic polymers containing zirconium atom are represented by the following structural formulas.

[Chemical Formulas 1]

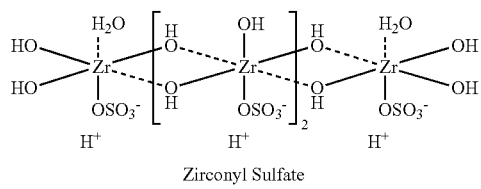

Zirconyl Nitrate (Exemplary Compound 1)

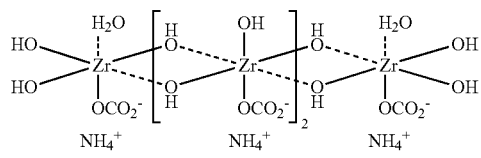

Zirconyl Sulfate (Exemplary Compound 2)

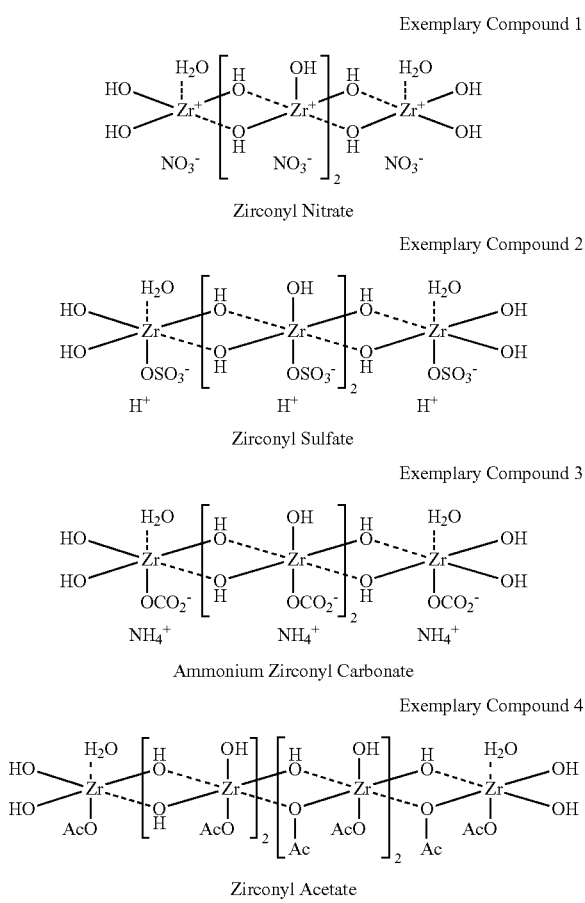

Ammonium Zirconyl Carbonate (Exemplary Compound 3)

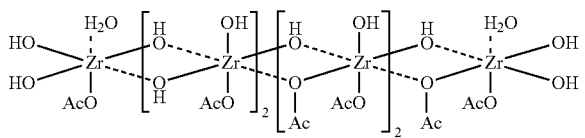

Zirconyl Acetate (Exemplary Compound 4)

Ac represents an acetyl group (CH$_3$CO-)

[Chemical Formula 2]

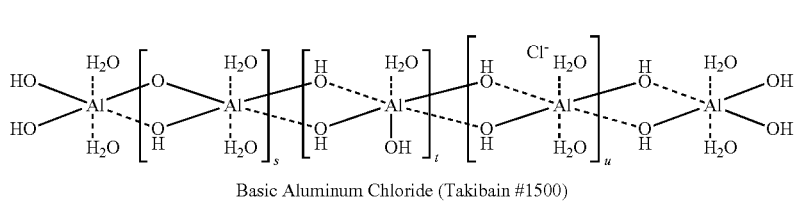

Basic Aluminum Chloride (Takibain #1500) (Exemplary Compound 6)

-continued

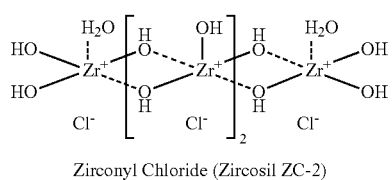

Zirconyl Chloride (Zircosil ZC-2) (Exemplary Compound 5)

In the formulas, s and t represent an integer or 1 or more.

The inorganic polymers containing zirconium atom may be used individually or in combination of two or more thereof.

The compounds containing zirconium atom may be used individually or in combination of two or more thereof.

Specific examples of the compounds containing aluminum atom which can be used in the present invention exclude aluminum oxide and can include aluminum fluoride, hexafluoroaluminate (such as, for example, the potassium salt), aluminum chloride, basic aluminum chloride (such as, for example, polyaluminum chloride), tetrachloroaluminate (such as, for example, the sodium salt), aluminum bromide, tetrabromoaluminate (such as, for example, the potassium salt), aluminum iodide, aluminate (such as, for example, the sodium salt, the potassium salt, and the calcium salt), aluminum chlorate, aluminum perchlorate, aluminum thiocyanate, aluminum sulfate, basic aluminum sulfate, aluminum sulfate potassium (alum), ammonium aluminum sulfate (ammoniumalum), sodium aluminum sulfate, aluminum phosphate, aluminum nitrate, aluminum hydrogenphosphate, aluminum carbonate, polyaluminum silicate sulfate, aluminum formate, aluminum acetate, aluminum lactate, aluminum oxalate, aluminum isopropirate, aluminum butyrate, ethyl acetate aluminum diisopropirate, aluminum tris(acetylacetonate), aluminum tris(ethylacetoacetate), and aluminum monoacetylacetonatebis(ethylacetoacetate).

Among them, aluminum chloride, basic aluminum chloride, aluminum sulfate, basic aluminum sulfate, and basic aluminum sulfate silicate are preferred. Most preferred are basic aluminum chloride and basic aluminum sulfate. Specific examples of commercially available products of the compounds include polyaluminum chloride (PAC) Takibain #1500 from Taki Chemical Co., Ltd., polyaluminiumhydroxide (Paho) from Asada Chemical Industry Co., Ltd., and Purachem WT from Rikengreen Co., Ltd., and the various grades can be used.

Takibain #1500 is represented by the following structural formula.

In the formula, s, t, and u represent an integer of 1 or more.

Preferably, the inorganic polymer is added in an amount of 1-100 parts by mass and more preferably 2-50 parts by mass based on 100 parts by mass of the inorganic oxide particles.

<Thickening Polysaccharide>

In the present invention, it is preferred to use a thickening polysaccharide as the water-soluble polymer.

Any thickening polysaccharide can be used without limitation in the present invention. Examples of the thickening polysaccharide can include, for example, natural simple polysaccharides, natural complex polysaccharides, synthetic simple polysaccharides, and synthetic complex polysaccharides which are commonly known. These polysaccharides are described in detail in, for example, "Seikagaku Jiten (Second Edition) published by Tokyo Kagaku Dojin and "Shokuhin Kogyo" Vol. 31 (1.988) pp. 21.

As used herein, the thickening polysaccharide refers to a polymer of saccharides and has the property of increasing the difference between the viscosity at low temperatures and the viscosity at high temperatures. Addition of a thickening polysaccharide of the present invention to a coating solution which includes metal oxide particulates allows increase in viscosity. The addition of the polysaccharide increases the viscosity at 15° C. by 1.0 mPa·s or more, preferably 5.0 mPa·s or more, and more preferably 10.0 mPa·s or more.

Examples of the thickening polysaccharide which can be used in the present invention include, for example, β1-4 glucans (such as, for example, carboxymethylcellulose and carboxyethylcellulose), galactans (such as, for example, agarose and agaropectin), galacto manno glycans (such as, for example, locust bean gum and guaran), xyloglucans (such as, for example, tamarind gum), gluco mannno glycans (such as, for example, arum mannan, wood derived glucomannan, and xanthan gum), galacto gluco manno glycans (such as, for example, softwood derived glycan), arabino galacto glycans (such as, for example, soybean derived glycan and microorganism derived glycan), gluco rhamno glycans (such as, for example, gellant gum), glycosamino glycans (such as, for example, hyaluronic acid and keratan sulfate), alginic acid and alginates, and natural polymer polysaccharides derived from red alga such as agar, κ-carragheenan, λ-carragheenan, ι-carragheenan, and furcelleran. Preferably, the constitutional units of the polysaccharide do not include a carboxylic acid group and a sulfonic acid group, in order to maintain the dispersion stability of the metal oxide particulates included in the coating solution. Preferably, such polysaccharide consists only of pentoses such as, for example, L-arabitose, D-ribose, 2-deoxyribose, and D-xylose, and hexoses such as D-glucose, D-fructose, D-mannose, and D-galactose. Specific examples of such polysaccharide which can preferably used include tamarind seed gum known as xyloglucan with a glucose backbone and glucose side chains, a guar gum known as galacto mannan with a mannose backbone and glucose side chains, cationized guar gum, and hydroxypropyl guar gum, locust bean gum, tara gum, and arabino galactan with a galactose backbone and arabinose side chains. In the present invention, tamarind, guar gum, cationized guar gum, and hydroxypropyl guar gum are especially preferred.

In the present invention, it is preferred to combine two or more of the thickening polysaccharides.

Preferably, the thickening polysaccharide is included in an amount of from 5% by mass to 50% by mass and more preferably from 10% by mass to 40% by mass. In a case, however, in which the thickening polysaccharide is combined with another water-soluble polymer and an emulsion resin, the thickening polysaccharide may be included in an amount of 3% by mass or more. Inclusion of the thickening polysaccharide in an amount of 50% by mass or less allows an appropriate relative amount of metal oxide, thereby readily increasing the difference of refractive index between the high refractive index layers and the low refractive index layers.

<Collagen Peptide>

The two or more layers which constitute the heat radiation reflective unit of the present invention and which have a different refractive index from one another can also include a collagen peptide.

Any commercially available collagen peptide can be used without limitation.

<Gelatin>

The two or more layers which constitute the heat radiation reflective unit of the present invention and which have a different refractive index from one another can also include a gelatin.

Examples of the gelatin of the present invention may include acid-treated gelatins and alkali-treated gelatins, as well as enzyme-treated gelatins, which are treated with an enzyme in the production of the gelatins, and gelatin derivatives, which have an amino functional group, an imino functional group, a hydroxyl functional group, and a carboxyl functional group in the molecule and which are treated with a reagent having a group which can react with the functional groups. A common method for producing the gelatin is generally known and is described in, for example, T. H. James: The Theory of Photographic Process 4th. ed. 1977 (Macmillan) pp. 55, Kagaku Shasin Binran (vol. 1) pp. 72-75 (Maruzen), and Shashin Kogaku no Kiso Gin-en Shasin Hen pp. 119-124 (Corona Publishing).

(Curing Agent)

In the present invention, it is preferred to use a curing agent to cure the water-soluble polymer as a binder.

Any curing agent may be used in the present invention as long as it undergoes a curing reaction with the water-soluble polymer. In a case in which the water-soluble polymer is a polyvinyl alcohol, a boric acid or a salt thereof is preferred. Other known curing agents can be used, and generally, the curing agent is selected according to the type of the water-soluble polymer, such as a compound having a group which can react with the water-soluble polymer or a compound which accelerates a reaction between different groups in the water-soluble polymer. Specific examples of the curing agent include, for example, epoxy curing agents (such as diglycidyl ethylether, ethylene glycol diglycidyl ether, 1,4-butanediol diglycidyl ether, 1,6-diglycidyl cyclohexane, N,N-glycidyl-4-glycidyloxy aniline, sorbitol polyglycidyl ether, and glycerol polyglycidyl ether), aldehyde curing agents (such as formaldehyde and glyoxal), active halogen curing agents (such as 2,4-dichloro-4-hydroxy-1,3,5-s-triazine), active vinyl compounds (such as 1,3,5-trisacryloyl-hexahydro-s-triazine and bisvinyl sulfonyl methyl ether), and aluminum alum.

The boric acid or a salt thereof refers to the oxyacid and a salt thereof having a boron central atom. Specific examples of the boric acid or a salt thereof include orthoboric acid, diboric acid, metaboric acid, tetraboric acid, pentaboric acid, octaboric acid, and salts thereof.

The boric acid or a salt thereof having a boron atom as the curing agent may be used individually as an aqueous solution or in combination of two or more thereof. An aqueous mixture of the boric acid and borax is especially preferred.

Although the boric acid and the borax are alone dissolved in water only at a relatively dilute concentration, a mixture of the boric acid and the borax can be dissolved in water at a high concentration, which allows provision of a concentrated coating solution. Advantageously, pH of the aqueous solution to be added can be relatively arbitrarily controlled.

The curing agent is preferably used in a total amount of 1-600 mg per gram of the water-soluble polymer.

[Surfactant]

At least one of the 6 or more layers which constitute the heat radiation reflective unit of the present invention and which have a different refractive index from one another may include a surfactant. Any of anionic, cationic, and nonionic surfactants can be used. Acetylenic glycol nonionic surfactants, quaternary ammonium salt cationic surfactants, and fluorinated cationic surfactants are especially preferred.

The surfactant of the present invention is preferably added in an amount of 0.005-0.30% by mass and more preferably 0.01-0.10% by mass on a solids basis, based on the total mass of the coating solution.

[Other Additives]

Now, other additives which can be used for the layers which constitute the heat radiation reflective unit of the present invention and which have a refractive index from one another will be described.

(Amino Acid)

In the present invention, an amino acid can also be added.

As used herein, the amino acid is a compound which has an amino group and a carboxyl group in the same molecule. Although any amino acids such as α-, β-, and γ-amino acids may be used, an amino acid having an isoelectric point of 6.5 or less is preferred. Although some amino acids have an optical isomer, the present invention is not significantly affected by the optical isomer, and thus any isomer having an isoelectric point of 6.5 or less can be used individually or in racemic form.

The amino acids which can be used in the present invention are described in detail in Kagaku Jiten 1 Compact Edition (published by Kyoritsu Shuppan in 1960) pp. 268-270.

Examples of the amino acids which are preferred for the present invention include glycine, alanine, valine, α-aminobutyric acid, γ-aminobutyric acid, β-alanine, serine, ε-amino-n-caproic acid, leucine, norleucine, phenylalanine, threonine, asparagine, aspartic acid, histidine, lysine, glutamine, cysteine, methionine, proline, and hydroxyproline. For use as an aqueous solution, the amino acid preferably has solubility in 100 g of water at the isoelectric point of 3 g or more. For example, amino acids such as glycine, alanine, serine, histidine, lysine, glutamine, cysteine, methionine, proline, and hydroxyproline are preferred. Considering that metal oxide particles have a weak hydrogen bond with the binder, it is more preferred to use serine and hydroxyproline having a hydroxyl group.

[Lithium Compound]

In the present invention, at least one layer of the high refractive index layers and the low refractive index layers can include a lithium compound in addition to the metal oxide particles and the water-soluble polymer.

Any lithium compound may be used without limitation in the present invention. Examples of the lithium compound include, for example, lithium carbonate, lithium sulfate, lithium nitrate, lithium acetate, lithium orotate, lithium citrate, lithiummolybdate, lithiumchloride, lithiumhydride, lithiumhydrozide, lithiumbromide, lithiumfluoride, lithium iodide, lithium stearate, lithium phosphate, lithium hexafluorophosphate, lithium aluminium hydride, lithium triethylborohydride, lithium triethoxyaluminum hydride, lithium tantalite, lithium hypochlorite, lithium oxide, lithium carbide, lithium nitride, lithium niobate, lithium sulfide, lithium borate, $LiBF_4$, $LiClO_4$, $LiPF_4$, and $LiCF_3SO_3$. Among them, lithium hydroxide is preferred, because it can sufficiently provide the effects of the present invention.

In the present invention, the lithium compound is preferably added in an amount of 0.005-0.05 g and more preferably 0.01-0.03 g per gram of the metal oxide particles included in the refractive index layers.

(Emulsion Resin)

Each of the layers which constitute the heat radiation reflective unit of the present invention and which have a different refractive index from one another can include an emulsion resin.

As used herein, the emulsion resin refers to resin particulates formed by emulsion-dispersing oil soluble monomers in an aqueous solution including a dispersant and emulsion-polymerizing the monomers using a polymerization initiator.

Examples of the dispersant used in the emulsion-polymerization include low molecular dispersants such as alkyl sulphonates, alkyl benzene sulphonates, diethylamine, ethylenediamine, and quaternary ammonium salts, and polymer dispersants such as polyoxyethylene nonyl phenyl ethers, polyoxyethylene lauryl ethers, hydrohyethyl cellulose, and polyvinyl pyrrolidones.

The emulsion resin of the present invention is a resin including resin fine particles (having an average particle diameter of 0.01-2 μm) emulsion-dispersed in an aqueous medium and is formed by emulsion-polymerizing oil soluble monomers using a polymer dispersant having a hydroxyl group. Although the polymer composition of the resulting emulsion resin is not basically affected by the type of the dispersant used, use of a polymer dispersant having a hydroxyl group in the emulsion-polymerization may allow formation of the fine particulates having a hydroxyl group at least on the surface, and thus the resulting emulsion resin has a different chemical and physical properties than emulsion resins formed using other dispersants.

The polymer dispersant having a hydroxyl group has a weight-average molecular weight of 10000 or more and has a side or terminal hydroxyl substituent. Examples of such polymer dispersant include, for example, copolymers of 2-ethyl hexyl acrylate with an acrylic polymer such as sodium polyacrylate and polyacrylamide, polyethers such as polyethylene glycol and polypropylene glycol, and polyvinyl alcohols. Polyvinyl alcohols are especially preferred.

Examples of the polyvinyl alcohols used as the polymer dispersant include common polyvinyl alcohols formed by hydrolyzing polyvinyl acetate, and modified polyvinyl alcohols such as cation-modified polyvinyl alcohols, anion-modified polyvinyl alcohols having an anionic group such as a carboxyl group, and silyl-modified polyvinyl alcohols having a silyl group. A polyvinyl alcohol having a higher average degree of polymerization is more effective in preventing cracking in formation of an ink-absorptive layer, while a polyvinyl alcohol having an average degree of polymerization of 5000 or less allows formation of the emulsion resin with a moderate viscosity, thereby improving handleability in the manufacture. Therefore, the polyvinyl alcohol preferably has an average degree of polymerization of 300-5000, more preferably 1500-5000, and still more preferably 3000-4500. The polyvinyl alcohol preferably has a degree of saponification of 70-100 mole percent and more preferably 80-99.5 mole percent.

Examples of resins emulsion-polymerized with the polymer dispersant as described above include homopolymers or copolymers of ethylene monomers such as acrylic acid esters, methacrylic acid esters, vinyl compounds, and styrene compounds, and diene compounds such as butadiene and isoprene, including, for example, acrylic resins, styrene-butadiene resins, and ethylene-vinyl acetate resins.

(Other Additives in Refractive Layers)

Each of the layers which constitute the heat radiation reflective unit of the present invention and which have a different refractive index from one another can include various known additives including, for example, ultraviolet light absorbers as described in Japanese Patent Application Publication No. S57-74193, S57-87988, and S62-261476, antifading agents as described in Japanese Patent Application Publication No. 557-74192, 357-87989, S60-72785, and 561-146591, anionic, cationic, and nonionic surfactants as described in Japanese Patent Application Publication No. H1-95091 and H3-13376, and optical brighteners, pH modifiers such as sulfuric acid, phosphoric acid, acetic acid, citric acid, sodium hydroxide, potassium hydroxide, and potassium carbonate, defoamers, lubricants such as diethyleneglycol, preservatives, antistatic agents, and matting agents as described in Japanese Patent Application Publication No. S59-42993, S59-52689, S62-280069, 561-242871, and H4-219266.

[Method for Producing Heat Radiation Reflective Film]

Various methods may De used to produce the heat radiation reflective film of the present invention. In a preferred embodiment of the present invention, the method includes a step of forming the layers which constitute the heat radiation reflective film by use of an aqueous-based coating solution. The heat radiation reflective film of the present invention includes units formed by laminating high refractive index layers and low refractive index layers on a substrate. In particular, an aqueous-based coating solution for forming a high refractive index layer and an aqueous-based coating solution for forming a low refractive index layer are preferably wet-applied alternately and dried to form a laminate.

The aqueous-based coating solution means a solution including a water as a major component. The solvent preferably includes water in an amount of 50% or more, more preferably 60% or more, still more preferably 70% or more, and especially preferably 80% or more. Examples of usable solvents other than water include, for example, alcohols such as methanol, ethanol, 2-propanol, and 1-butanol, ethers such as ethylene glycol, diethylene glycol, and triethylene glycol, amides such as dimethylformamide and N-methylpyrrolidone, and ketones such as acetone and methyl ethyl ketone. These solvents may be used individually or in combination of two or more thereof.

Examples of preferred coating technique includes, for example, dip coating, blade coating, air knife coating, wire bar coating, gravure coating, reverse coating, reverse roll coating, extrusion coating, slide coating, curtain coating, and extrusion coating. Especially, roll coating, rod bar coating, air knife coating, spray coating (using a spin coater), slide coating (using a slide coater), curtain coating, slide bead coating described in U.S. Pat. Nos. 2,761,419 and 2,761,791, and extrusion coating are preferred.

In a case of simultaneously applying the coating solutions by slide bead coating to form multiple layers, the coating solution for forming a high refractive index layer and the coating solution for forming a low refractive index layer preferably have a viscosity of 5-100 mPa·s and more preferably 10-50 mPa·s. In a case of using curtain coating, the coating solutions preferably have a viscosity of 5-1200 mPa·s and more preferably 25-500 mPa·s.

The coating solutions preferably have a viscosity at 15° C. of 10 mPa·s or more, more preferably 100-30,000 mPa·s, still, more preferably 3,000-30,000 mPa·s, and most preferably 10,000-30,000 mPa·s.

Preferably, the aqueous-based coating solution for forming a high refractive index layer and the coating solution for forming a low refractive index layer are heated to 30° C. or more and applied, and then the applied films are cooled to 1-15° C. once and dried at 10° C. or higher. More preferably, the applied films are dried at a wet bulb temperature of 5-50° C. and the film surface temperature of 10-50° C. Preferably, the applied films are cooled with the substrate horizontal in order to provide uniform coated films.

The heat radiation reflective film of the present invention may include, at the bottom of the support or on the outermost surface layer opposite to the support, one or more functional layers such as a conductive layer, an antistatic layer, a gas barrier layer, an adhesion promoting layer (adhesive layer), an antifouling layer, an odor eliminating layer, a dripping layer, a lubricating layer, a hard coating layer, an abrasion-resistance layer, an antireflection layer, an electromagnetic shielding layer, a heat radiation absorbing layer, an ultraviolet light absorbing layer, an infrared absorbing layer, a ultraviolet protection layer, a printing layer, a fluorescent layer, a hologram layer, a release layer, a sticking layer, an adhesive layer, a heat radiation protection layer other then the high refractive index layer and the low refractive index layer of the present invention (such as a metal layer and a liquid crystal layer), a coloring layer (visible light absorbing layer), and an interlayer film used in a laminated glass, in order to provide an additional function.

Although any technique can be used without limitation to form these functional layers, wet coating such as spin coating, spray coating, blade coating, and dip coating, and dry coating such as a deposition process are preferred.

[Application of Heat Radiation Reflective Film]

The heat radiation reflective film of the present invention can be suitably applied to various types of neat radiation reflectors in a wide range of fields. For example, the film can be applied onto an article exposed to sunlight for a long period of time, such as the window glass of a building and a vehicle, as, for example, a heat radiation reflective firm for window to provide a heat radiation reflective effect and a film for arm agricultural greenhouse mainly to improve weather resistance.

Especially, the heat radiation reflective film of the present invention is suitable for an article which includes a glass substrate or a resin substrate in place of a glass substrate to which the heat radiation reflective film can be attached directly or via an adhesive.

The adhesive is applied so that the heat radiation reflective film can receive sunlight (heat radiation) when the film is attached to an article such as window glass. It is also preferred to sandwich the heat radiation reflective film between window glass and the substrate to seal the film from ambient atmosphere including moisture, for increase of durability. It is also preferred to attach the heat radiation reflective film of the present invention to the exterior of a building and a vehicle, for increase of environmental durability.

Examples of the adhesive which can be used in the present invention include adhesives which include a photocurable or thermosetting resin as a major component.

The adhesive preferably has ultraviolet resistance, and acrylic adhesives and silicone adhesives are preferred. In view of adhesion properties and costs, acrylic adhesives are more preferred. Especially, acrylic solvent adhesives are preferred compared to acrylic emulsion adhesives, due to easiness of controlling peel strength. In a case in which a solution polymerization polymer is used as the acrylic solvent adhesive, any known monomer can be used.

A polyvinyl butyral resin used as an interlayer film for a laminated glass or an ethylene-vinyl acetate copolymer resin may also be used. Specific examples of such resins include plasticized polyvinyl butyral from, for example, Sekisui Chemical Co., Ltd. and Mitsubishi Monsanto Chemical Co., ethylene-vinyl acetate copolymers from E.I. du Pont de Nemours and Co., such as Duramin from Takeda Pharmaceutical Co., Ltd., and modified ethylene-vinyl acetate copolymers such as Melthene G from Tosoh Corp. An additive such as an ultraviolet light absorber, an antioxidant, an antistatic agent, a thermal stabilizer, a lubricant, a filler, a coloring agent, and an adhesion modifier may be optionally added to the adhesive layer.

Examples

Now, the present invention will be specifically described with reference to examples, although the present invention is not limited thereto. As used in the examples, "part" and "%" refers to "parts by mass" and "percent by mass" respectively, unless otherwise specified.

Example I

Preparation of Coating Solution 1

22.5 of a 5.0% by mass aqueous solution of acid-treated gelatin was admixed, in small portions with stirring, with 20.2 g of 30.0% by mass silica oxide sol with a volume average particle diameter of 20 nm (silicon dioxide particles available under the trade name of Silicadol 20P from Nippon Chemical Industrial Co., Ltd.). Then 0.043 g of 5.0% by mass 2-LB-500E from NOF Corp. as a surfactant was added, and pure water was added to bring the volume to 75 ml to prepare a coating solution 1.

Preparation of Coating Solution 2

22.5 g of a 5.0% by mass aqueous solution of acid-treated gelatin was admixed, in small portions with stirring, with 20.2 g of 15.0% by mass titanium oxide sol with a volume average particle diameter of 5 nm (rutile-type titanium oxide particles available under the trade name of SRD-W from Sakai Chemical Industry Co., Ltd.). Then 0.043 g of 5.0% by mass 2-DB-500E from NOF Corp. as a surfactant was added, and pure water was added to bring the volume to 75 ml to prepare a coating solution 2.

Production of Comparative Samples 1-5 and Samples of the Present Invention (Inventive Samples) 1-6

An adhesion promoted PET film was cut into a 7 cm×7 cm sheet and applied onto an 8 cm×8 cm glass substrate via water which included about 0.1% of dishwashing detergent (Joy from P&G). The coating solution 1 was dropped onto the film and coated using a spin coater at an adjusted rotational speed so that a dried layer to be formed had a thickness of 170 nm. Then the film was removed from the glass surface and dried on a hot plate at 80° C. for 3 minutes. The film was again applied onto the glass substrate via water, and the coating solution 2 was dropped and coated so that a dried layer to be formed had a thickness of 130 nm. The film was again removed from the glass surface and dried on a hot plate at 80° C. for 3 minutes. This cycle was repeated to produce comparative samples 1-5 and samples of the present invention (hereinafter also simply referred to as "inventive samples") 1-6.

(Evaluation)

<Measurement of Refractive Index>

Each of the refractive layers to be measured for refractive index was applied in monolayer onto a substrate to produce a sample. The sample was cut into a 10 cm×10 cm sheet and measured for refractive index by the following process. U-4000 spectrophotometer from Hitachi, Ltd. was used in the measurement. The opposite side (backside) of the surface to be measured of the sample was roughened and treated with black spray such that the backside absorbed light thereby preventing reflection of light. 25 points in the sample were measured at a specular angle of 5 degree for the reflectance in the visible range from 400 to 700 nm, and the measurements were averaged to determine the average refractive index.

<Evaluation of Adherence Property>

The coated film was conditioned at 23° C. and a relative humidity of 80% for a day, and scratched at an angle of 20-30° to the surface of the film to place a 3 cm long cut.

Cellotape® adhesive tape from Nichiban Co., Ltd. was applied perpendicularly to the length direction of the scratch such that the tape extended from 2 cm from one side of the scratch to 2 cm from the another side of the scratch, and the longitudinal center of the scratch and the transverse center of the tape were fixed by applying a pressure. The tape was quickly removed at an angle of 45°, and the adherence property of the film was evaluated in accordance with the following criteria. The position where the cut was placed ("cut position") was used as a reference position for the evaluation.

<Evaluation>

0: The film exhibited delamination in the area −0.1 cm to −2.0 cm away from the scratch position (in the area without the scratch (the area beyond the starting position and ahead of the scratch position)).

1: The film exhibited delamination in the area more than 2 cm from the scratch position (at the scratch position and in the area without the tape).

2: The film exhibited delamination in the area 2 cm from the scratch position (at the scratch position and in the area with the tape applied).

3: The film exhibited delamination in the area 1 cm or more and 2 cm less from the scratch position.

4: The film exhibited delamination in the area 0.2 cm or more and less than 1 cm from the scratch position.

5: The film exhibited delamination in the area 0 cm or more and less than 0.2 cm from the scratch position.

6: The film exhibited no delamination.

<Evaluation of Visible Reflected Light>

The coated film was irradiated by a fluorescent lamp and visually observed at an angel of 45 degree to evaluate the color of the reflected light in accordance with the following criteria.

5: Substantially colorless
4: Very little color
3: Little color
2: some degree of color
1: Distinct color <Measurement of Average Heat Radiation Reflectance (Integrated Heat Radiation Reflectance)>

The above-mentioned spectrophotometer (U-4000 from Hitachi, Ltd.) was equipped with a 5° reflection unit, and baseline correction was performed using the accessory mirror. Then reflectance of 301 points located at intervals of 2 nm on the side including the heat radiation reflective unit was measured in the range of 800-1400 nm. The resulted reflectance values were added together and divided by 301 to give the average heat radiation reflectance, which was then evaluated in accordance with the following criteria.

1: Average heat radiation reflectance of less than 1%
2: Average heat radiation reflectance of from 1% or more to less than 4%
3: Average heat radiation reflectance of from 4% or more to less than 19%
4: Average heat radiation reflectance of from 19% or more to less than 34%
5: Average heat radiation reflectance of 34% or more The evaluation results are illustrated in Table 1. In the table, the comparative samples and the inventive samples are illustrated as comparative examples and examples, respectively.

TABLE 1

| | Heat Radiation Reflective Unit (Thickness: nm) | | | | | | | | | | |
|---|---|---|---|---|---|---|---|---|---|---|---|
| | First Layer | Second Layer | Third Layer | Fourth Layer | Fifth Layer | Sixth Layer | | | | | |
| | | | Coating Solution | | | | | | | | |
| | Coating | Coating | Coating | Coating | Coating | Coating | Number of | Blended | Evaluation Results | | |
| | Solution 1 | Solution 2 | Solution 1 | Solution 2 | Solution 1 | Solution 2 | Heat Radiation Reflective | Region In Heat Reflective | Adherence | Visible Light | Integrated Heat Radiation |
| Comparative Example and Example No. | | | Refractive Index | | | | | | | | |
| | 1.44 | 1.91 | 1.44 | 1.91 | 1.44 | 1.91 | Units | Unit | property | Reflectance | Reflectance |
| Comparative Example 1 | 170 | 130 | 170 | 130 | 170 | 130 | 1 | 0 | 2 | 2 | 3 |
| Comparative Example 2 | 170 | 130 | 1190 | 130 | 170 | 910 | 1 | 0 | 2 | 4 | 3 |
| Comparative Example 3 | 340 | 130 | 170 | 130 | 170 | 130 | 1 | 0 | 3 | 3 | 1 |
| Comparative Example 4 | 170 | 260 | 170 | 130 | 170 | 130 | 1 | 0 | 3 | 3 | 1 |
| Comparative Example 5 | 340 | 260 | 170 | 130 | 170 | 130 | 1 | 0 | 3 | 3 | 1 |
| Example 1 | 510 | 130 | 170 | 130 | 170 | 130 | 1 | 0 | 4 | 4 | 3 |
| Example 2 | 595 | 130 | 170 | 130 | 170 | 130 | 1 | 0 | 4 | 4 | 3 |
| Example 3 | 680 | 130 | 170 | 130 | 170 | 130 | 1 | 0 | 4 | 4 | 3 |
| Example 4 | 510 | 390 | 170 | 130 | 170 | 130 | 1 | 0 | 5 | 4 | 3 |
| Example 5 | 595 | 455 | 170 | 130 | 170 | 130 | 1 | 0 | 5 | 4 | 3 |
| Example 6 | 680 | 390 | 170 | 130 | 170 | 130 | 1 | 0 | 5 | 4 | 3 |

As seen from the results illustrated in Table 1, the samples of the present invention are superior to the comparative examples in each of the evaluations.

Thus it is found that the present invention can provide a heat radiation reflective film which has a high heat radiation reflectance and good adherence property (peel resistance), which can have a large surface area, and which de-emphasizes certain visible reflected lights; and a method for producing the film.

Example II

Preparation of Coating Solution 3

11.5 g of a 5.0% by mass aqueous solution of collagen peptide available under the trade name of SCP-5200 from Nitta Gelatin Inc. was admixed, in small portions with stirring, with 20.2 g of 15.0% by mass titanium oxide sol with a volume average particle diameter of 5 nm (rutile-type titanium oxide particles available under the trade name of SPD-W from Sakai Chemical Industry Co., Ltd.). Then 15 g of 2.5% by mass tamarind seed gum was added, followed by 0.043 g of 5.0% by mass 2-DB-500E from NOF Corp. as a surfactant. Pure water was added to bring the volume to 50 ml to prepare a coating solution 3.

Preparation of Coating Solution 4

11.5 g of a 5.0% by mass aqueous solution of collagen peptide available under the trade name of SCP-5200 from Nitta Gelatin Inc. was admixed, in small portions with stirring, with 20.2 g of 15.0% by mass titanium oxide sol with a volume average particle diameter of 5 nm (rutile-type titanium oxide particles available under the trade name of SRD-W from Sakai Chemical Industry Co., Ltd.). Then 11 g of 5.0% by mass polyvinyl alcohol available under the trade name of Exceval RS-2117 from Kuraray Co., Ltd. was added, followed by 0.043 g of 5.0% by mass 2-DB-500E from NOF Corp. as a surfactant. Pure water was added to bring the volume to 50 ml to prepare a coating solution 4.

Production of Comparative Samples 6-9 and Samples of the Present Invention 7-14

Comparative Sample 6

An adhesion promoted PET film was cut into a 7 cm×7 cm sheet and applied onto an 8 cm×8 cm glass substrate via water which included dishwashing detergent (Joy from P&G). The coating solution 1 was dropped onto the film and coated using a spin coater at an adjusted rotational speed so that a dried layer to be formed had a thickness of 1.70 nm. Then the film was removed from the glass surface and dried on a hot plate at 80° C. The film was again applied onto the glass substrate via water, and the coating solution 2 was dropped and coated so that a dried layer to be formed had a thickness of 130 nm. The film was again removed from the glass surface and dried on a hot plate at 80° C. This cycle was repeated to laminate a total of 6 layers. The process for laminating 6 layers was repeated a total of 4 times to produce a comparative sample 6.

Comparative Sample 7

An adhesion promoted PET film was cut into a 7 cm×, 7 cm sheet and applied onto an 8 cm×8 cm glass substrate via water which included dishwashing detergent (Joy from P&G). The coating solution 1 was dropped onto the film and coated using a spin coater at an adjusted rotational speed so that a dried layer to be formed had a thickness of 170 mm. Then the film was removed from the glass surface and dried on a hot plate at 80° C. The film was again applied onto the glass substrate via water, and the coating solution 3 was dropped and coated so that a dried layer to be formed had a thickness of 130 nm. The film was again removed from the glass surface and dried on a hot plate at 80° C. The coating solution 1, the coating solution 3, the coating solution 1, and the coating solution 3, in this order, were coated and dried as described above so that a dried layer to be formed had a thickness as shown in Table 2 to laminate a total of 6 layers. The process for laminating 6 layers was repeated a total of 4 times to produce a comparative sample 7.

Comparative Sample 8

The coating solutions 1 and 2 were simultaneously coated alternately to form multiple layers, using a 24 layer slide coater with the flow rate of each of the layers and the coating speed adjusted so that the formed layers had a thickness as illustrated in Table 2, thereby producing a comparative sample 8.

The simultaneous coating was a process of applying the coating solution for forming a high refractive index layer and the coating solution for forming a low refractive index layer using the 24 layer slide coater to form a multilayered laminate and drying the laminate at 50° C. for 5 minutes to produce the comparative sample 8 which included four 6-layered units.

Inventive Sample 7

The coating solutions 1 and 2 were simultaneously coated alternately to form multiple layers, using a 24 layer slide coater with the flow rate of each of the layers and the coating speed adjusted so that the formed layers had a thickness as illustrated in Table 2, thereby producing an inventive sample 7.

The simultaneous coating was a process of applying the coating solution for forming a high refractive index layer and the coating solution for forming a low refractive index layer using the 24 layer slide coater to form a multilayered laminate; cooling the laminate by airflow at 0° C. for 5 minutes; drying the laminate at 50° C. for 5 minutes to produce the inventive sample 7 which included four 6-layered units.

Inventive Sample 8

In a manner similar to the manner used for the inventive sample 7, the coating solutions 1 and 3 were simultaneously coated alternately to form multiple layers, using a 24 layer slide coater with the flow rate of each of the layers and the coating speed adjusted so that the formed layers had a thickness as illustrated in Table 2, thereby producing an inventive sample 8.

Inventive Sample 9

In a manner similar to the manner used for the inventive sample 7, the coating solutions 1 and 4 were simultaneously coated alternately to form multiple layers, using a 24 layer slide coater with the flow rate of each of the layers and the coating speed adjusted so that the formed layers had a thickness as illustrated in Table 2, thereby producing an inventive sample 8.

Inventive Sample 10

The coating solutions 1 and 4 were simultaneously coated alternately to form multiple layers, using a 12 layer slide coater with the flow rate of each of the layers and the coating speed adjusted so that the formed layers had a thickness as illustrated in Table 2, thereby producing an inventive sample 10.

The simultaneous coating was a process of applying the coating solution for forming a high refractive index layer and the coating solution for forming a low refractive index layer using the coater to form a 6-layered laminate; cooling the laminate by airflow at 0° C. for 5 minutes; and drying the laminate at 50° C. for 5 minutes to form a 6-layered unit. Onto the 6-layered unit, the coating solution for forming a high refractive index layer and the coating solution for forming a low refractive index layer were coated using the coater to form a 6-layered laminate; cooling the laminate by airflow at 0° C.; and drying the laminate at 50° C. for 5 minutes to form an additional 6-layered unit (second unit). This process was repeated to form the inventive sample 10 which included a total of 4 units which included 6 layers per unit.

Inventive Sample 11

In a manner similar to the manner used for the inventive sample 10, the coating solutions 1 and 2 were simultaneously coated alternately to form multiple layers, using a 12 layer slide coater with the flow rate of each of the layers and the coating speed adjusted so that the formed layers had a thickness as illustrated in Table 2, thereby producing an inventive sample 11.

Inventive Sample 12

In a manner similar to the manner used for the inventive sample 10, the coating solutions 1 and 3 were simultaneously coated alternately to form multiple layers, using a 12 layer slide coater with the flow rate of each of the layers and the coating speed adjusted so that the formed layers had a thickness as illustrated in Table 2, thereby producing an inventive sample 12.

Inventive Sample 13

In a manner similar to the manner used for the inventive sample 10, the coating solutions 1 and 4 were simultaneously coated alternately to form multiple layers, using a 12 layer slide coater with the flow rate of each of the layers and the coating speed adjusted so that the formed layers had a thickness as illustrated in Table 2, thereby producing an inventive sample 13.

Inventive Sample 14

In a manner similar to the manner used for the inventive sample 10, the coating solutions 1 and 3 were simultaneously coated alternately to form multiple layers, using a 12 layer slide coater with the flow rate of each of the layers and the coating speed adjusted so that the formed layers had a thickness as illustrated in Table 2, thereby producing an inventive sample 14.

(Evaluation)

The obtained samples were evaluated in the same manner as in the Example I. The evaluation results are illustrated in Table 2. In the table, the comparative samples and the inventive samples are illustrated as comparative examples and examples, respectively.

The obtained samples were sputtered from the outermost surface as 0 nm at a rate of 0.5 nm/min using an XPS surface analyzer to determine the atomic composition ratio, thereby creating the depth profile of Si and Ti. The nested region composed of Si and Ti was considered as a blended region, and a region composed only of Si or Ti was determined. For example, the combination of the thickness of a region composed only of Si and half the thickness of the both adjacent blended regions was considered as the thickness of a silica layer, while the combination of the thickness of a region composed only of Ti and half the thickness of the both adjacent blended regions was considered as the thickness of a titania layer. And a ratio of the thickness of a blended region to the thickness of a silica or titania layer was determined. The thickness of "the blended regions in a unit" was determined by determining the thickness of all of the blended regions in the unit and calculating the arithmetic average of the obtained values. The thickness of "the blended region between units" was determined by determining the thickness of all of the blended regions between adjacent units and calculating the arithmetic average of the obtained values.

A layer formed by using the coating solution 3 and a layer formed by using the coating solution 4 had a refractive index of 1.90 and 1.95, respectively.

As seen from the results illustrated in Table 2, the samples of the present invention are superior to the comparative examples in each of the evaluations.

Thus it is found that the present invention can provide a heat radiation reflective film which has a high heat radiation reflectance and good adherence property (peel resistance), which can have a large surface area, and which de-emphasizes certain visible reflected lights; and a method for producing the film.

Example III

Production of Heat Radiation Reflector

The heat radiation reflective films 1-5 produced in the Example I were used to produce heat radiation reflectors 1-5.

TABLE 2

| Comparative Example and Example No. | Coating Method | Heat Radiation Reflective Unit (Upper: Coating Solution, Lower: Thickness (nm)) | | | | | |
|---|---|---|---|---|---|---|---|
| | | First Layer | Second Layer | Third Layer | Fourth Layer | Fifth Layer | Sixth Layer |
| Comparative Example 6 | Spin | Coating Solution 1 170 | Coating Solution 2 130 | Coating Solution 1 170 | Coating Solution 2 130 | Coating Solution 1 170 | Coating Solution 2 130 |
| Comparative Example 7 | Spin | Coating Solution 1 170 | Coating Solution 3 130 | Coating Solution 1 1190 | Coating Solution 3 130 | Coating Solution 1 170 | Coating Solution 3 910 |
| Comparative Example 8 | Slide | Coating Solution 1 170 | Coating Solution 2 130 | Coating Solution 1 1190 | Coating Solution 2 130 | Coating Solution 1 170 | Coating Solution 2 910 |
| Example 7 | Slide | Coating Solution 1 510 | Coating Solution 2 130 | Coating Solution 1 170 | Coating Solution 2 130 | Coating Solution 1 170 | Coating Solution 2 130 |
| Example 8 | Slide | Coating Solution 1 510 | Coating Solution 3 390 | Coating Solution 1 170 | Coating Solution 3 130 | Coating Solution 1 170 | Coating Solution 3 130 |
| Example 9 | Slide | Coating Solution 1 510 | Coating Solution 4 390 | Coating Solution 1 170 | Coating Solution 4 130 | Coating Solution 1 170 | Coating Solution 4 130 |
| Example 10 | Slide | Coating Solution 1 680 | Coating Solution 4 390 | Coating Solution 1 170 | Coating Solution 4 130 | Coating Solution 1 170 | Coating Solution 4 130 |
| Example 11 | Slide | Coating Solution 1 510 | Coating Solution 2 130 | Coating Solution 1 170 | Coating Solution 2 130 | Coating Solution 1 170 | Coating Solution 2 130 |
| Example 12 | Slide | Coating Solution 1 510 | Coating Solution 3 390 | Coating Solution 1 170 | Coating Solution 3 130 | Coating Solution 1 170 | Coating Solution 3 130 |
| Example 13 | Slide | Coating Solution 1 510 | Coating Solution 4 390 | Coating Solution 1 170 | Coating Solution 4 130 | Coating Solution 1 170 | Coating Solution 4 130 |
| Example 14 | Slide | Coating Solution 1 680 | Coating Solution 3 390 | Coating Solution 1 170 | Coating Solution 3 130 | Coating Solution 1 170 | Coating Solution 3 130 |

| Comparative Example and Example No. | Number of Heat Radiation Reflective Units | Thickness of Blended Region* | | Evaluation Results | | |
|---|---|---|---|---|---|---|
| | | In Heat Radiation Reflective Unit | Between Heat Radiation Reflective Units | Adherence property | Visible Light Reflectance | Integrated Heat Rediation Reflectance |
| Comparative Example 6 | 4 | 0 | 0 | 1 | 2 | 2 |
| Comparative Example 7 | 4 | 0 | 0 | 2 | 3 | 2 |
| Comparative Example 8 | 4 | 1 or more | 1 or more | 5 | 1 | 0 |
| Example 7 | 4 | 0.4 | 0.45 | 5 | 4 | 4 |
| Example 8 | 4 | 0.6 | 0.45 | 5 | 4 | 4 |
| Example 9 | 4 | 0.8 | 0.8 | 5 | 4 | 4 |
| Example 10 | 4 | 0.6 | 0.6 | 5 | 4 | 4 |
| Example 11 | 4 | 0.4 | 0.4 | 6 | 5 | 4 |
| Example 12 | 4 | 0.6 | 0.2 | 6 | 5 | 5 |
| Example 13 | 4 | 0.8 | 0.1 | 6 | 5 | 5 |
| Example 14 | 4 | 0.6 | 0.2 | 6 | 5 | 5 |

*Ratio of the thickness of a blended region to the thickness of the layer farthest from the support in a heat radiation reflective unit (multiplication ratio)

Each of the heat radiation reflective film samples 1-5 was attached, with an acrylic adhesive, to a 20 cm×20 cm transparent acrylic resin plate having a thickness of 5 mm to produce the heat radiation reflectors 1-5.

[Evaluation]

Reflectance of the heat radiation reflectors 1-5 obtained as described above was measured in the range of 800-1400 nm using a spectrophotometer (U-4000 from Hitachi, Ltd.) equipped with an integrating sphere attachment, and the average was calculated to determine the heat radiation reflectance. The result shows that the heat radiation reflectors 1-5 can be easily used despite of large size of the heat radiation reflector and that the heat radiation reflective film of the present invention can provide great heat radiation reflection.

The present application is based on Japanese Patent Application No. 2011-060736 filed on Mar. 18, 2011, the disclosure of which is incorporated herein by reference.

DESCRIPTION OF THE REFERENCE NUMERAL

1 low refractive index layer
2 high refractive index layer
3 blended region
4 heat radiation reflective unit (first unit)
5 heat radiation reflective unit (unit adjacent to first unit)
6 blended region

What is claimed is:

1. A heat radiation reflective film comprising:
   at least one heat radiation reflective unit on one surface of a support, the unit comprising:
   at least 6 laminated layers, each layer having a different refractive index from an adjacent layer,
   wherein a first unit as one of the heat radiation reflective units comprises the layer closest to the support having a thickness which is 3 times or more of the thickness of the layer farthest from the support,
   the layers which constitute the first unit adjoin each other via a blended region having a thickness 0.4-0.8 times the thickness of the layer farthest from the support, and
   the heat radiation reflective unit includes metal oxide particles and a water-soluble polymer in at least one layer.

2. The heat radiation reflective film of claim 1, wherein the first unit comprises a layer which is adjacent to the layer closest to the support and which has a thickness which is 3 times or more of the thickness of the layer farthest from the support.

3. The heat radiation reflective film of claim 1, wherein the first unit adjoins two adjacent heat radiation reflective units, via a blended region having a thickness 0.1-0.4 times the thickness of the layer farthest from the support.

4. A method for producing the heat radiation reflective film of claim 1, the method comprising a step of forming layers which constitute the heat radiation reflective film by use of an aqueous-based coating solution.

5. A heat radiation reflector comprising the heat radiation reflective film of claim 1.

6. The heat radiation reflective film of claim 1, wherein the layer closest to the support has a thickness which is 3.5 times or more of the thickness of the layer farthest from the support.

7. The heat radiation reflective film of claim 1, wherein the layer closest to the support has a thickness of 350-1000 nm.

8. The heat radiation reflective film of claim 2, wherein the layer which is adjacent to the layer closest to the support has a thickness of 60-500 nm.

9. The heat radiation reflective film of claim 1, wherein the heat radiation reflective unit has a high refractive index layer and a low refractive index layer, both the layer closest to the support and the layer farthest from the support being a low refractive index layer.

10. The heat radiation reflective film of claim 1, wherein the heat radiation reflective unit is disposed on one side of the support, and a second heat radiation reflective unit which is the same as or different from the first unit is disposed on the opposite side of the support.

11. The heat radiation reflective film of claim 10, wherein the heat radiation reflective unit has a high refractive index layer and a low refractive index layer, the layer closest to the support being a low refractive index layer.

12. The heat radiation reflective film of claim 11, wherein the layer closest to the support has a thickness of 350-1000 nm.

13. The heat radiation reflective film of claim 2, wherein the layers which constitutes the first unit adjoin each other via a blended region having a thickness 0.4-0.8 times the thickness of the layer farthest from the support.

14. A heat radiation reflector of claim 5, wherein the heat radiation reflective film is attached on a glass substrate.

15. The heat radiation reflective film of claim 1, wherein the first unit has a high refractive index layer and a low refractive index layer, and the components of the high refractive index layer and the low refractive index layer are blended in the blended region.

16. The heat radiation reflective film of claim 1, wherein the first unit has a high refractive index layer and a low refractive index layer, and the interface of the high refractive index layer and the low refractive index layer has asperities in the blended region.

* * * * *